United States Patent
Morton et al.

(10) Patent No.: US 11,797,787 B2
(45) Date of Patent: Oct. 24, 2023

(54) METHODS, APPARATUSES, AND SYSTEMS FOR POWER CONTROL ON VEHICLE MOUNTED RFID SYSTEM

(71) Applicant: INTERMEC IP CORP., Lynnwood, WA (US)

(72) Inventors: Bruce Morton, Lake Stevens, WA (US); Rene Martinez, Lynnwood, WA (US); Richard Blair, Kent, WA (US)

(73) Assignee: INTERMEC IP CORP., Lynnwood, WA (US)

( * ) Notice: Subject to any disclaimer, the term of this patent is extended or adjusted under 35 U.S.C. 154(b) by 0 days.

(21) Appl. No.: 18/045,771

(22) Filed: Oct. 11, 2022

(65) Prior Publication Data
US 2023/0053396 A1     Feb. 23, 2023

Related U.S. Application Data

(63) Continuation of application No. 16/803,399, filed on Feb. 27, 2020, now Pat. No. 11,501,094.

(51) Int. Cl.
*G06K 7/10* (2006.01)
*B60R 16/033* (2006.01)
(Continued)

(52) U.S. Cl.
CPC ........ *G06K 7/10217* (2013.01); *B60R 16/033* (2013.01); *B60R 16/04* (2013.01); *B60L 1/00* (2013.01)

(58) Field of Classification Search
CPC .. G06K 7/10217; B60R 16/033; B60R 16/04; B60L 1/00; Y02D 30/70; Y02T 90/16; G06F 1/263; H04W 52/0206
See application file for complete search history.

(56) References Cited

U.S. PATENT DOCUMENTS 7,034,683 B2   4/2006  Ghazarian
7,724,145 B2   5/2010  Batra et al.
(Continued)

FOREIGN PATENT DOCUMENTS

CN      206431651 U    8/2017
DE    102007059347 A1  6/2009
(Continued)

OTHER PUBLICATIONS

DE 102007059347 (Siemens) dated Jun. 25, 2009, English machine translation, 4 pages (Year: 2022).
(Continued)

*Primary Examiner* — Tuyen K Vo
(74) *Attorney, Agent, or Firm* — Alston & Bird LLP (57) ABSTRACT

Vehicle mounted Radio Frequency Identification (RFID) systems and associated methods are provided. An example vehicle mounted RFID system is configured to operate an RFID system in a high-power mode. The example vehicle mounted RFID system is further configured to determine that an operating state of a vehicle switched from an active charging state to an inactive state. The example vehicle mounted RFID system is further configured to, in response to determine that the operating state of the vehicle switched from the active charging state to the inactive state, initialize a timer for a period of time. The example vehicle mounted RFID system is further configured to, in response to an elapse of the period of time, switch the RFID system to a low-power mode.

20 Claims, 3 Drawing Sheets

(51) Int. Cl.
*B60L 1/00* (2006.01)
*B60R 16/04* (2006.01)

(56) References Cited

U.S. PATENT DOCUMENTS

| | | | |
|---|---|---|---|
| 8,013,759 B1* | 9/2011 | Aid | B60D 1/58 340/471 |
| 2006/0164223 A1 | 7/2006 | Gilbert et al. | |
| 2007/0182576 A1 | 8/2007 | Proska et al. | |
| 2008/0255723 A1 | 10/2008 | Sano | |
| 2009/0289793 A1 | 11/2009 | Morin | |
| 2013/0009650 A1* | 1/2013 | Sakakibara | B60L 58/12 324/633 |
| 2013/0187760 A1 | 7/2013 | Teran-Matus | |
| 2014/0346859 A1 | 11/2014 | Skarani et al. | |
| 2016/0379430 A1 | 12/2016 | Kimura et al. | |
| 2018/0087908 A1* | 3/2018 | Bailey | G01C 21/20 |
| 2018/0152031 A1* | 5/2018 | Zhai | B60L 53/65 |

FOREIGN PATENT DOCUMENTS

| | | |
|---|---|---|
| JP | 02-262857 A | 10/1990 |
| JP | 2014-189361 A | 10/2014 |
| JP | 6163819 B2 | 7/2017 |

OTHER PUBLICATIONS

Extended European search opinion and written opinion dated Nov. 10, 2021 for EP Application No. 21157732, 19 pages.
JP2014189361A (NEC Corp) dated Oct. 6, 2014, English machine translation, 8 pages (Year: 2022).
Non-Final Office Action received for U.S. Appl. No. 16/803,399, dated Feb. 23, 2022, 10 pages.
Notice of Allowance and Fees Due (PTOL-85) dated Sep. 29, 2022 for U.S. Appl. No. 16/803,399.
Notice of Allowance received for U.S. Appl. No. 16/803,399, dated Jul. 11, 2022, 8 pages.
Partial European search report dated Jul. 21, 2021 for EP Application No. 21157732, 18 pages.

* cited by examiner

METHODS, APPARATUSES, AND SYSTEMS FOR POWER CONTROL ON VEHICLE MOUNTED RFID SYSTEM

CROSS-REFERENCE TO RELATED APPLICATIONS

This patent application is a continuation of U.S. patent application Ser. No. 16/803,399, filed Feb. 27, 2020, each of which is incorporated herein by reference in its entirety

FIELD OF THE INVENTION

Example embodiments of the present disclosure relate generally to radio frequency identification (RFID) systems, and, more particularly, to method, system and apparatus for vehicle mounted RFID systems.

BACKGROUND

RFID (Radio Frequency Identification) is a radio frequency technology that may be utilized to acquire, store and manage all the necessary information related to an object attached to an RFID tag. RFID systems are massively used in a variety of application areas, such as identity management, access management, item tracking, and the like. RFID systems may be mounted on various platforms, such as a vehicle.

Applicant has identified a number of deficiencies and problems associated with vehicle mounted RFID systems. Through applied effort, ingenuity, and innovation, many of these identified problems have been solved by developing solutions that are included in embodiments of the present disclosure, many examples of which are described in detail herein.

BRIEF SUMMARY

Accordingly, in one aspect, the present system and method may employ a power-efficient RFID system mounted on a vehicle. In some embodiments, a method for operating a vehicle mounted Radio Frequency Identification (RFID) system is provided. The method comprises operating an RFID system in a high-power mode; determining that an operating state of a vehicle switched from an active charging state to an inactive state; in response to determining that the operating state of the vehicle switched from the active charging state to the inactive state, initializing a timer for a period of time; and in response to an elapse of the period of time, switching the RFID system to a low-power mode.

In some embodiments, the method further comprises: receiving a signal from a motion sensor indicative of a detected motion in the vehicle; in response to receiving the signal indicative of the detected motion, switching the RFID system to a high-power mode; and re-initializing the timer for the period of time.

In some embodiments, the method further comprises: determining that the operating state of the vehicle switched to the active charging state or an active noncharging state; and in response to determining that the operating state of the vehicle switched to the active charging state or the active noncharging state, switching the RFID system to the high-power mode.

In some embodiments, the vehicle is in the active charging state when the engine or motor of the vehicle is on; and the vehicle is in the inactive state when the engine or motor of the vehicle is off.

In some embodiments, determining that the operating state of the vehicle switched from the active charging state to the inactive state comprises using a voltage detector to monitor a vehicle battery associated with the vehicle. In some embodiments, the RFID system is powered by a backup battery connected to a vehicle battery associated with the vehicle in the low-power mode. In some embodiments, the method further comprises causing the backup battery to start charging from the vehicle battery in response to determining that the operating state of the vehicle switched to the active charging state. In some embodiments, the method further comprises causing the backup battery to stop charging from the vehicle battery in response to determining that the operating state of the vehicle switched to the inactive state.

In some embodiments, the RFID system is configured to transmit an interrogation signal to a plurality of RFID tags associated with a plurality of items loaded in the vehicle in the high-power mode. In some embodiments, the method further comprises, receiving a response from an RFID tag of the plurality of RFID tags, in response to the interrogation signal.

In some embodiments, determining that the operating state of the vehicle switched from the active charging state to the inactive state comprises receiving an electric signal from a wire physically attached with an ignition switch of the vehicle.

In some embodiments, a vehicle mounted Radio Frequency Identification (RFID) system is provided. The vehicle mounted RFID system is configured to: operate an RFID system in a high-power mode; determine that an operating state of a vehicle switched from an active charging state to an inactive state; in response to determine that the operating state of the vehicle switched from the active charging state to the inactive state, initialize a timer for a period of time; and in response to an elapse of the period of time, switch the RFID system to a low-power mode.

In some embodiments, the RFID system is further configured to receive a signal from a motion sensor indicative of a detected motion in the vehicle; and in response to receiving the signal indicative of the detected motion, switch the RFID system to a high-power mode; and re-initialize the timer for the period of time.

In some embodiments, the RFID system is further configured to determine that the operating state of the vehicle switched to the active charging state or an active noncharging state; and in response to determining that the operating state of the vehicle switched to the active charging state or the active noncharging state, switch the RFID system to the high-power mode.

In some embodiments, the vehicle is in the active charging state when the engine or motor of the vehicle is on. In some embodiments, the vehicle is in the inactive state when the engine or motor of the vehicle is off. In some embodiments, determining that the operating state of the vehicle switched from the active charging state to the inactive state comprises using a voltage detector to monitor a vehicle battery associated with the vehicle. In some embodiments, the RFID system is powered by a backup battery connected to a vehicle battery associated with the vehicle in the low-power mode. In some embodiments, the RFID system is further configured to cause the backup battery to start charging from the vehicle battery in response to determining that the operating state of the vehicle switched to the active charging state.

In some embodiments, the RFID system is further configured to cause the backup battery to stop charging from the vehicle battery in response to determining that the operating state of the vehicle switched to the inactive state. In some embodiments, the RFID system in the high-power mode is configured to transmit an interrogation signal to a plurality of RFID tags associated with a plurality of items loaded in the vehicle.

In some embodiments, the RFID system is further configured to receive a response from an RFID tag of the plurality of RFID tags, in response to the interrogation signal.

In some embodiments, determining that the operating state of the vehicle switched from the active charging state to the inactive state comprises receiving an electric signal from a wire physically attached with an ignition switch of the vehicle.

The foregoing illustrative summary, as well as other exemplary objectives and/or advantages of the present invention, and the manner in which the same are accomplished, are further explained within the following detailed description and its accompanying drawings.

DETAILED DESCRIPTION OF THE INVENTION

Definitions and Overview

Some embodiments of the present disclosure will now be described more fully hereinafter with reference to the accompanying drawings, in which some, but not all embodiments of the disclosure are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Unless the context requires otherwise, throughout the specification and claims which follow, the word "comprise" and variations thereof, such as, "comprises" and comprising" are to be construed in an open sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

The word example" or "exemplary" is used herein to mean "serving as an example, instance, or illustration." Any implementation described herein as "exemplary" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that a specific component or feature is not required to be included or to have the characteristic. Such component or feature may be optionally included in some embodiments, or it may be excluded.

An RFID reader in the RFID system transmits interrogation signals in form of electromagnetic waves to any number of RFID tags disposed on respective objects located in an interrogation zone. In response to the interrogation signals, the RFID tags perform backscattering modulation by modulating a magnitude and a phase of scattered electromagnetic wave of the electromagnetic waves transmitted from the RFID reader. The backscattered modulated electromagnetic waves, comprising information about corresponding RFID tags, are returned to the RFID reader. Accordingly, the RFID reader receives and processes information stored in the internal memory units of the respective RFID tags.

In examples related to delivery of products, it is understood that products, items (e.g., packages), and/or the like may be moved around during transportation and delivery. In some examples, items may move or fall. Items may also be moved by an operator attempting to capture or otherwise reach another item, or in other examples, an item may be hard to locate in a given space. In such situations, considerable time may be wasted or otherwise lost attempting to locate an item. Additionally, it is important to keep track of the locations of the items to ensure that the items are not accidentally lost, stolen, or otherwise misplaced. Further, in the event that an item is lost, it is important to receive information regarding its status to ensure that remedial actions may be taken.

One exemplary option for improving the delivery of products via a vehicle (e.g., truck, cart, van, trailer, car, bicycle, moped, and/or the like) is to rely on an RFID system, which may be provided in a vehicle loaded with items, such as packages, for monitoring the locations of the items. Because the items may be moved at any time regardless of whether the vehicle is moving or not, the RFID system may need to be running while the vehicle's engine or motor is off to monitor the locations of the items loaded in the vehicle.

However, RFID systems draw large amounts of power from a power supply which often has limited capacity on a vehicle or other form of mobile conveyance. For example, the RFID system may draw power from a vehicle battery. In such cases, the RFID system may drain the vehicle battery if the RFID system keeps running after the vehicle engine or motor has been turned off. Even if the RFID system uses a battery separate from the vehicle battery to power, the RFID system may nonetheless drain its own battery and stop functioning, leading to lack of proper monitoring after a relatively short amount of time. Therefore, a power control method, as is disclosed in some examples herein, ensures the operations of a vehicle mounted RFID system. Various embodiments of the present example embodiments disclosed here provide systems and methods for power control of a vehicle mounted RFID system.

The term "vehicle mounted RFID system" refers to a RFID system, including an RFID reader, that is physically installed on a vehicle. In some embodiments, the vehicle mounted RFID system may be powered by the vehicle battery. Additionally or alternatively, the vehicle mounted RFID system may be powered by a backup battery connected to the vehicle battery and the backup battery may be charged by the vehicle battery. In other examples, the backup battery may be charged by way of energy generated by regenerative braking, solar power, wind power, and/or the like. In some embodiments, the RFID system may be configured to control the charging of the backup battery. For example, the backup battery may start charging from the vehicle battery in response to determining that the operating state of the vehicle switched to an active charging state. Additionally or alternatively, the backup battery may stop charging from the vehicle battery in response to determining that the operating state of the vehicle switched to an inactive state. In some embodiments, the RFID system is not connected to the vehicle battery.

The term "active charging state" refers to an operating state of a vehicle where an internal machine configured to convert one form of energy to mechanical energy driving the vehicle, such as a combustion engine or an electric motor, is on. In some embodiments where the internal machine configured to convert one form of energy to mechanical energy driving the vehicle is a combustion engine, an automotive battery associated with the vehicle is being charged in the active charging state.

The term "active noncharging state" refers to an operating state of a vehicle where the engine or motor is still off but one or more user controlled devices in the vehicle, such as radio, light, or the like, has switched from off to on as a result of a user turning a key (e.g., to an accessory position or other position that provides a 12V source) or otherwise activating the vehicle.

The term "inactive state" refers to an operating state of a vehicle where the vehicle's engine or motor is turned off and one or more one or more user controlled devices in the vehicle, such as radio, light, or the like, are not switched from off to on.

The term "backup battery" refers to a battery powering a vehicle mounted RFID system that is separate and distinct from the vehicle battery. In some embodiments, the backup battery may be connected to the vehicle battery. In some examples, the backup battery may be charged by the vehicle battery whereas in other examples, the backup battery may be charged from an external source (e.g., regenerative braking, solar power, wind power, connected to a charging station, and/or the like).

The term "low-power mode" refers to a mode of operation of a vehicle mounted RFID system where the RFID system is not actively monitoring locations of one or more RFID tags. In some embodiments, the RFID system is not configured to transmit interrogation signals in the low-power mode. In some embodiments, in low-power mode, the RFID system continues to communicate with a motion sensor and may switch to a high-power mode based on signals from motion sensor (or other occupancy or movement sensor) that indicates a movement in a storage space (e.g., a location where one or more items are stored) within the vehicle.

In some embodiments, the RFID system may communicate with a voltage detector that is in communication with the vehicle electrical system (e.g., the vehicle battery). In instances in which the voltage detector indicates the vehicle is on and/or the battery is charging, the RFID system may switch to a high-power mode.

The term "high-power mode" refers to a mode of operation of a vehicle mounted RFID system where the RFID system is actively monitoring locations of one or more RFID tags (e.g., by transmitting one or more interrogation signals). In some embodiments, the RFID system is transmitting interrogation signals in the high-power mode. In some embodiments, the RFID system continues to communicate with the motion sensor and the voltage detector in the high-power mode.

System Architecture and Example Apparatus

Figure 1:
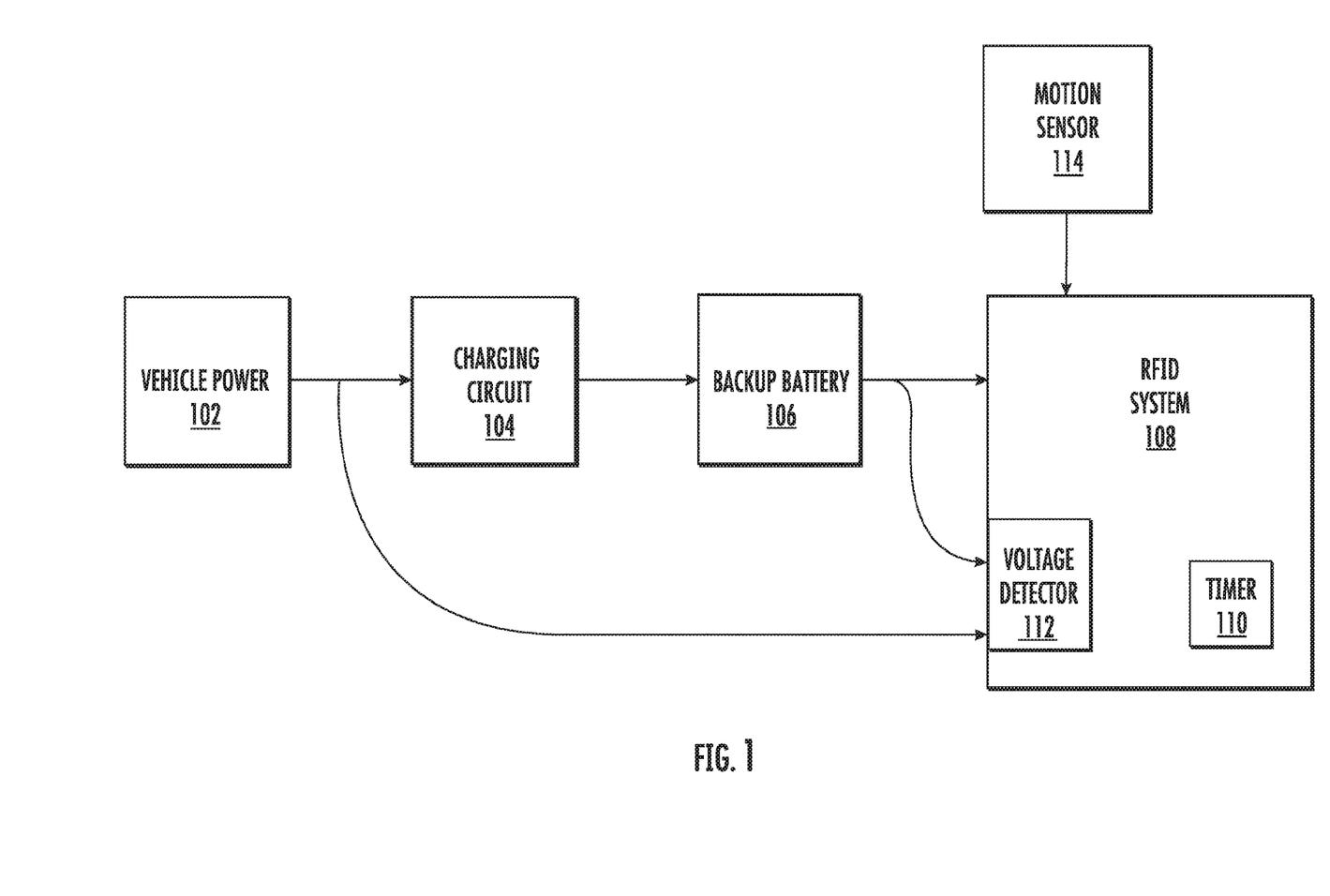
FIG. 1 illustrates a schematic block diagram of a vehicle mounted RFID system, according to one or more embodiments of the present disclosure described herein.

FIG. 1 illustrates a schematic block diagram of a vehicle mounted RFID system, according to one or more embodiments of the present disclosure described herein. As illustrated in FIG. 1, an example RFID system 108 includes a timer 110 and a voltage detector 112. The RFID system 108 may be powered by backup battery 106 and/or vehicle power 102 (e.g., a vehicle battery). The vehicle power 102 may be configured to charge the backup battery 106 via a charging circuit 104. In some embodiments, the vehicle power 102 may power the backup battery 106 when the engine or motor is on, indicating that the vehicle is in the active charging state.

In some embodiments, the RFID system 108 may further include a voltage detector 112 configured to monitor voltages of with the vehicle power system 102 and/or the backup battery 106. By monitoring voltages of the vehicle power 102 and/or the backup battery 106, the RFID system may determine the operating state of the vehicle. For example, the voltage detector 112 may monitor the vehicle power 102 and determine that a vehicle battery associated with the vehicle power 102 is charging, indicating that the vehicle is in an active charging state.

The RFID system may be connected to a motion sensor 114 configured to detect motion within the vehicle and/or exterior to the vehicle. The motion sensor 114 may be embodied by a variety of motion sensors, such as a passive infrared motion sensor, a microwave motion sensor, an area reflective type motion sensor, an ultrasonic motion sensor, or other suitable motion sensors. In some embodiments, the motion sensor 114 is configured to detect motion that exceed a movement threshold for the purpose of monitoring potential movement by an operator within the vehicle that may be indicative of the movement of one or more items loaded in the vehicle. For example, the motion sensor 114 may be configured to distinguish movement that is associated with driving, such as an operator movement related to steering a steering wheel, depressing pedals, setting the transmission to a different gear, or the like, from other motions, such as potentially item related motions. In some embodiments, the motion sensor 114 may be configured to ignore movements that are associated with driving, such as steering a steering wheel, depressing pedals, setting the transmission to a different gear, or the like. Alternatively or additionally, signals from the motion sensor may be ignored when the vehicle is an active charging state or is otherwise determined to be moving (e.g., based on a GPS signal, an accelerometer, or the like).

In some embodiments, the motion sensor may be configured to detect motion within one or more pre-defined spaces within the vehicle, such as an item storage space, a driving space, or the like. In some embodiments, the motion sensor may be configured to distinguish between the one or more pre-defined spaces. For example, motions within the item storage space may be determined to be potentially item related motion and motion within the driving space may be determined to be a driving related motion. In some embodiments, a driving related motion may be used to determine an operating state of the vehicle. In some embodiments, potentially item related motion may be used to switch the RFID system from a low-power mode to a high-power mode.

Alternatively or additionally, the motion sensor 114 may be configured to identify movement outside of a vehicle. For example, the motion sensor may detect that the vehicle is a moving condition and/or in a stopped position. In some embodiments, the motion sensor may be configured to detect movement associated with one or more doors associated with the vehicle. In some embodiment, the motion sensor 114 may be configured to detect movements that are associated with driving, such as steering a steering wheel, depressing pedals, setting the transmission to a different gear, or the like. The motion sensor 114 may therefore be configured to transmit a signal representing driving related movement that is different from the signal representing movement by an operator within the vehicle that may be indicative of the movement of one or more items loaded in the vehicle. For example, the RFID system 108 may use signal representing driving related movement to determine an operating state of the vehicle. If signals representing driving related movement is detected, the RFID system 108 may determine that the vehicle is in the active charging state. Alternatively or additionally, signals from other onboard systems (e.g., navigation system, speedometer, or the like) and/or other sensors (e.g., an accelerometer, a mobile device, or the like) may provide additional inputs that are usable to determine whether the vehicle is in the active charging state.

Figure 2:
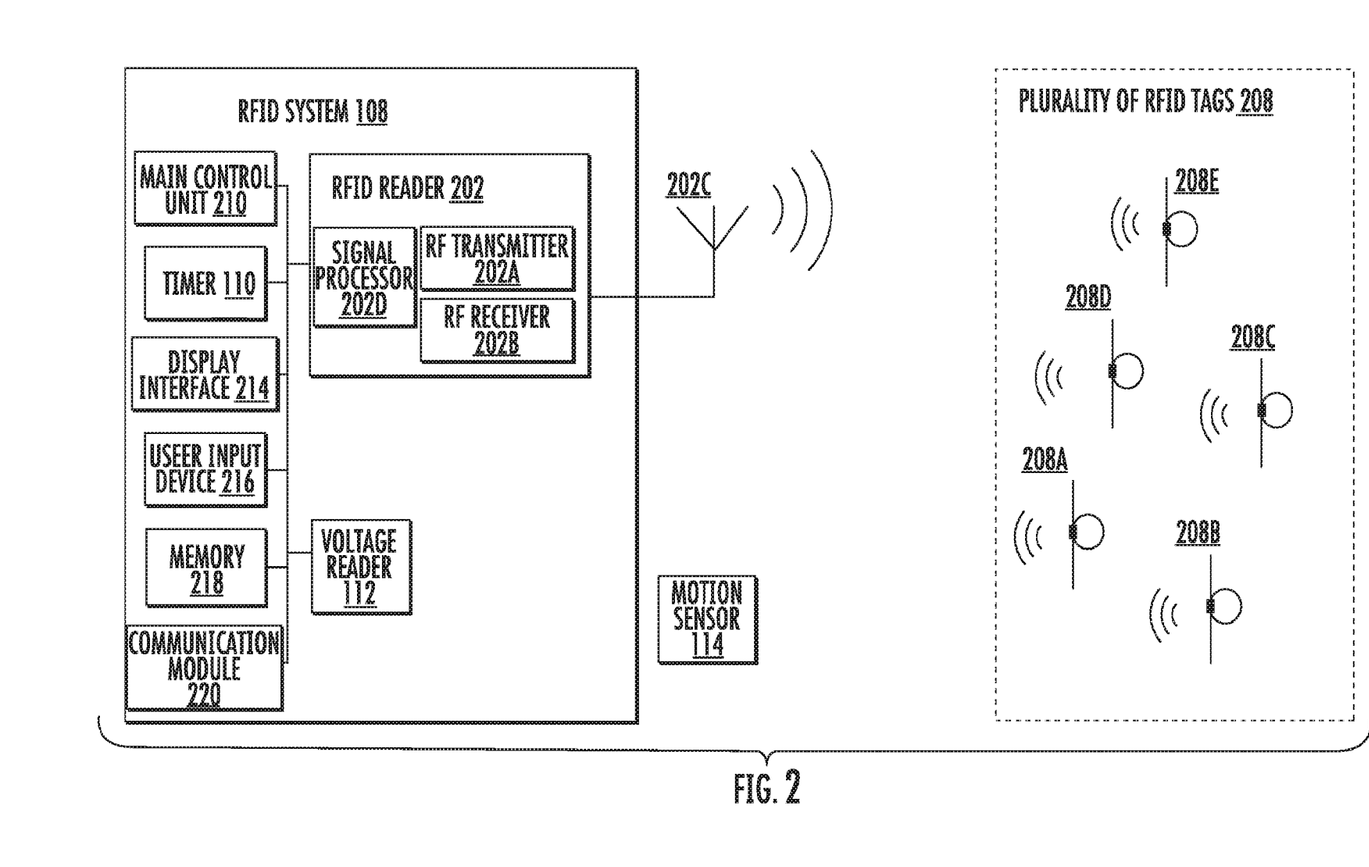
FIG. 2 illustrates additional details of the RFID system, according to one or more embodiments of the present disclosure described herein.

Additional details of the RFID system 108 are illustrated in FIG. 2. As illustrated in FIG. 2, in an example embodiment, the RFID system 108 may be configured to monitor a plurality of RFID tags 208 associated with one or more items loaded in the vehicle. Although FIG. 2 illustrates five RFID tags 208A-208E, the present disclosure contemplates that the plurality of RFID tags 208 may include any number of RFID tags, without deviation from the scope of the disclosure. The RFID reader system 108 may include an RFID reader 202. The RFID reader system 202 may further include a main control unit 210, a display interface 214, a user input device 216, a memory 218, and a communication module 220. In some embodiments, a RFID tag may be associated with an item by being physically affixed to the item. In some embodiments, the RFID tag may be identified by a unique identifier associated with the item, such as a tracking number or another identifier associated with the RFID tag that may be additionally associated with an item identifier.

Each component of the RFID system 108 may have one or more respective chipsets or hardware units. Such chipsets may operate based on a chipset specification, including parameters or operating conditions, throughout the description. In this regard, as described previously, the chipset specification may be accessible via interpretation or processing of software code containing hardware specific drivers, and other routines which drives operation for such chipsets. Additionally, the chipset specification may be indicative of, but not limited to, modes of operation, threshold values, or any other parameter that influence operations, functions, or performance associated with any of such chipsets.

In some embodiments of the present disclosure, the RFID system 108 may be configured to determine a location of the plurality of RFID tags 208. In various embodiments, the RFID reader system 108 may communicate with the plurality of RFID tags 208 using a combination of one or more reader antennas, thus referred to as multiple antenna, multiple tags (MAMT) system. Based on the number of tags placed on one or more objects and the number of reader antennas the RFID reader system 108, the MAMT system may be reduced to one or more sub-systems, such as a single antenna, multiple tag (SAMT) system, a multiple antenna, single tag (MAST) system, or a single antenna, single tag (SAST) system.

In various embodiments, the RFID reader system 108 may be configured to transmit information to the plurality of RFID tags 208 by modulating an RF carrier using various keying technologies, such as double-sideband amplitude shift keying (DSB-ASK), single-sideband amplitude shift keying (DSB-ASK), or phase-reversal amplitude shift-keying (PR-ASK) using a pulse-interval encoding (PIE) format.

The RFID reader 202 may include a RF transmitter 202A, a RF receiver 104B, an antenna 202C, and a signal processor 104D. The RF transmitter 202A and the RF receiver 202B may be electrically coupled to the antenna 104C. It should be noted that although the antenna 202C is illustrated as being configured to switch between transmission and reception of RF interrogation signals and backscattered signals respectively, the RFID reader 202 can include additional separate transmit or receive antennas that may be arranged in an array, which may be symmetrical or asymmetrical with respect to each other. For example, the receive antennas may be arranged in, for example, a rectangular array configuration or aligned to form arrays with different sizes and shapes, as desired or needed, such as based on the plurality of RFID tags 208 to be interrogated. The RF transmitter 202A and the RF receiver 202B may be selectively turned on and off to communicate with the plurality of RFID tags 208 to transmit the interrogation RF signals and acquire RFID tag location information, which then may, for example, provide information about location of each of the plurality of RFID tags 208.

In response to receiving RF interrogation signals from the RFID reader system 102, each of the plurality of RFID tags 208 may be configured to transmit response RF signals to back the RFID reader 202. In some embodiments, the backscattered signal may include useful data, such as an Electronic Product Code (EPC) identifier or a tag identifier (TID). The response signal may include a representation of a binary string, at least part of which is equal to at least part of the specified one or more TIDs. Each of the plurality of RFID tags 208 may store corresponding tag identifier in corresponding memory units. In some embodiments, each of the plurality of RFID tags 208 may be attached to a corresponding inventory object and may further store a product code, the EPC code, and/or at least one alphanumeric string identifying the corresponding inventory object. In some embodiments, each of the plurality of RFID tags 208 may be a passive RFID tag configured to harvest energy from the RF interrogation signal. The harvested energy may be utilized to power an antenna structure. In some embodiments, the RFID system may be configured to receive a signal representing scanning of an item associated with a RFID tag of the plurality of RFID tags 208 and may stop scanning the RFID tag accordingly.

The main control unit 210 may be embodied as one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application specific integrated circuit (ASIC) or field programmable gate array (FPGA), or some combination thereof. Accordingly, although described herein with reference to a single controller in an example embodiment, the present disclosure contemplates that the main control unit 210 may include a plurality of processors and signal processing modules, without deviation from the scope of the disclosure. The plurality of processors may be in operative communication with each other and may be collectively configured to perform one or more functionalities of the circuitry of the RFID system 100, as described herein. In an example embodiment, the main control unit 210 may be configured to execute instructions stored in a host device (not shown) or otherwise accessible to the main control unit 110. These instructions, when executed by the main control unit 110, may cause the circuitry of the RFID system 108 to perform one or more of the functionalities, as described herein. In some embodiments, the main control unit may also control charging of the backup battery 106 and may cause the backup battery to start or stop charging from the vehicle power 102.

Whether configured by hardware, firmware/software methods, or by a combination thereof, the main control unit 210 may include an entity capable of performing operations according to embodiments of the present disclosure while configured accordingly. Thus, for example, when the main control unit 210 is embodied as an ASIC, FPGA or the like, the main control unit 210 may include specifically configured hardware for conducting one or more operations described herein. Alternatively, in another example, when the main control unit 210 is embodied as an executor of instructions retrieved from the local memory of the host device, the instructions may specifically configure the main control unit 210 to perform one or more algorithms and operations described herein.

Thus, the main control unit 210 used herein may refer to a programmable microprocessor, microcomputer, or multiple processor chip(s) that can be configured by software instructions (applications) to perform a variety of functions, including the functions of the various embodiments described above. In some devices, multiple processors may be provided and are dedicated to wireless communication functions, and one processor dedicated to running other applications. Software applications may be stored in the internal memory before they are accessed and loaded into the processors. The processors may include internal memory sufficient to store the application software instructions. In many devices, the internal memory may be a volatile or nonvolatile memory, such as flash memory, or a mixture of both. The memory can also be located internal to another computing resource (e.g., enabling computer readable instructions to be downloaded over the Internet or another wired or wireless connection).

The display interface 214 may include suitable logic, circuitry, interfaces, and/or code that may be configured to, under the control of the main control unit 210, display suitable information. For example, the display interface 214 may display location information of one or more of the plurality of RFID tags 208 associated with one or more objects in a display area. As such, the display interface 214 may display the location of one or more items. In some examples, the display interface 214 may display a particular location of an item in response to an input of a tracking number, a delivery location associated with one or more items (e.g., items identified based on delivery location and current vehicle location), and/or any other identifying indicia of an item.

The user input device 216 may include suitable logic, circuitry, interfaces, and/or code that may be configured to receive input from the user handling the RFID reader system 102. Various examples of the user input device 216 may include, but not limited to, a keyboard, a mouse, a touchpad, or other actuation means. In some embodiments, the display interface 214 and the user input device 216 are separate devices and coupled to the main control unit 210. In another embodiment, the display interface 214 and the user input device 216 may be integrated, such as in touch screens, and coupled to the main control unit 210 to allow the user to interact with the RFID system 208.

The memory 218 may include, for example, volatile memory, non-volatile memory, or some combination thereof. Although illustrated in FIG. 2 as a single memory, the memory 218 may include a plurality of memory components. The plurality of memory components may be embodied on a single electronic device or distributed across a plurality of electronic devices. In various embodiments, the memory 218 may include, for example, a hard disk, random access memory, cache memory, read only memory (ROM), erasable programmable read-only memory (EPROM) & electrically erasable programmable read-only memory (EEPROM), flash memory, magnetic cassettes, magnetic tape, magnetic disk storage or other magnetic storage devices, a compact disc read only memory (CD-ROM), digital versatile disc read only memory (DVD-ROM), an optical disc, circuitry configured to store information, or some combination thereof. The memory 218 may be configured to store instructions and/or applications for enabling the circuitry of the RFID reader system 108 to carry out various functions in accordance with example embodiments of the present disclosure.

The communication module 220 may be embodied as an interface, device, or means embodied in circuitry, hardware, a computer program product including computer readable program instructions stored on a computer readable medium (e.g., the memory 218) and executed by a processing device (e.g., the main control unit 210), or any combination thereof that is configured to receive/transmit data from/to another device, system, and/or network. In an example embodiment, the communication module 220 (like other components discussed herein) may be at least partially embodied as or otherwise controlled by the main control unit 210. In this regard, the communication module 220 may be in communication with the main control unit 210, such as via a bus. The communication module 220 may include, for example, an antenna, a transmitter, a receiver, a transceiver, a network interface card, and/or supporting hardware and/or firmware/software to enable communication with another electronic device. The communication module 220 may be configured to receive and/or transmit signals and/or data that may be stored by the memory 218 by use of a protocol for communication between various electronic devices. The communication module 220 may additionally or alternatively be in communication with the memory 218 and/or any other component of the circuitry of the RFID reader system 108, via a means, such as a bus. In various embodiments, wireless communication interface of the communication module 220 may be configured to support, for example, but not limited to, various protocols, such as IEEE 802.11/802.15/802.16 protocol family, at least one protocol of the HSPA/GSM/GPRS/EDGE protocol family, TDMA protocol, UMTS protocol, LTE protocol, and/or at least one protocol of the CDMA/1×EV-DO protocol family. In some embodiments, the communication module 220 may transmit information, such as RFID tag location information, information received from the RFID tags, operating state of the vehicle, and mode of operation of the RFID system, to a remote server in real-time or near real-time to facilitate monitoring of one or more items and the vehicle.

Example Operations

Figure 3:
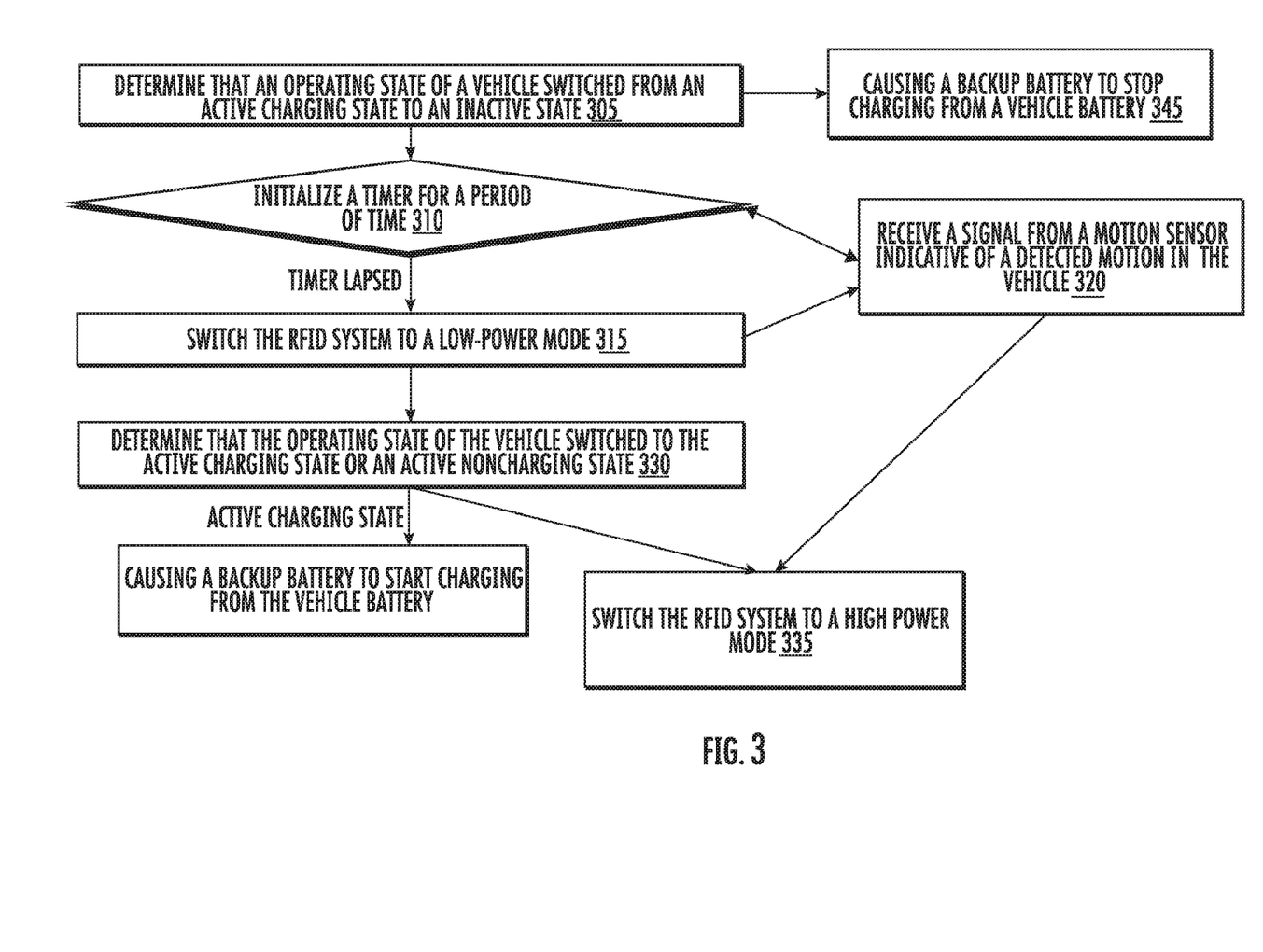
FIG. 3 is a flowchart of an exemplary method for operating a vehicle mounted RFID system, according to one or more embodiments of the present disclosure described herein.

FIG. 3 is a flowchart of an exemplary method 300 for operating a vehicle mounted RFID system, such as RFID system 108. It will be understood that exemplary method 300 may performed by a hardware processor (such as main control unit 210) of an exemplary RFID system, in conjunction with or controlled by suitable computer code which implements the method. The code may be encoded directly into either of the logic of main control unit 210 or may be stored as firmware in memory (such as memory 218).

Method 300 may begin with step 305, where the RFID system is configured to that an operating state of a vehicle switched from an active charging state to an inactive state.

In some embodiments, the RFID system may determine that the operating state of a vehicle switched from an active charging state to an inactive state by using a voltage detector, such as the voltage detector 112, to monitor a vehicle battery associated with the vehicle. For example, the voltage detector 112 may monitor the vehicle power 102, such as one or more voltages or voltage ranges associated with the vehicle power 102, and determine that a battery associated with the vehicle power 102 has started charging, indicating that the vehicle is in the active charging state.

Additionally or alternatively, the RFID system may be configured to receive an electric signal from a wire physically attached with an ignition switch of the vehicle. The electric signal may indicate that the ignition switch has been switched which may be used to determine the operating state. For example, in some embodiments, the ignition switch may be switched to a step indicating the active noncharging state or may be switched to a step indicating the active charging state.

Alternatively or additionally, in some embodiments, the RFID system may be configured to receive a signal, such as a signal from the motion sensor, a door sensor, and/or the like, that represents an opening/closing motion associated with a door of the vehicle. Upon receiving such a signal, the RFID system may determine that the vehicle is switching the operating state.

Alternatively or additionally, in some embodiments, the RFID system may determine the vehicle's state using other means such as, by way of example, an accelerometer. The accelerometer may send a signal indicating that the vehicle is in a moving state and, in response, it may be determined that the vehicle is in the active charging state to the RFID system.

Alternatively or additionally, in some embodiments, the accelerometer may send a signal representing non-movement. In such cases, it may be determined that the vehicle is in the inactive state.

In some embodiments, the RFID system may be connected to a Global Positioning System (GPS) unit configured to track the location of the RFID system. Upon receiving a signal from the GPS unit that is indicative of the RFID system moving, the RFID system may determine that the vehicle is in the active charging state. Upon receiving a signal representing that the location of the RFID system is no longer changing from the GPS unit, the RFID system may determine that the vehicle is in the inactive state.

In some embodiments, because the vehicle may be still in the active charging state when the vehicle is not moving, the RFID system may utilize a different unit, such as the voltage detector or the motion sensor previously described, to determine the operating state of the vehicle after receiving the signal representing that the location of the RFID system is not changing from the GPS unit. The RFID system may also receive other signals from other suitable devices in other embodiments.

In step 310 of method 300, the RFID system is configured to, in response to determining that the operating state of the vehicle switched from the active charging state to the inactive state, initialize a timer for a period of time. The timer may be the timer 110 illustrated in FIG. 1. In some embodiments, the period of time may have a pre-defined duration. Additionally, in step 345 of method 300, the RFID system may, in response to determining that the operating state of the vehicle switched from the active charging state to the inactive state, cause a backup battery powering the RFID system, such as the backup battery 106, to stop charging or otherwise drawing from a vehicle battery, such as a vehicle battery associated with vehicle power 102. In some embodiments, the RFID system may cause the backup battery to stop charging by directly controlling the backup battery via the main control unit 210.

In step 315 of method 300, the RFID system is configured to, in response determining that the timer duration has expired, switch the RFID system to a low-power mode. In some embodiments, in the low-power mode, the RFID system is not actively monitoring locations of one or more RFID tags as the RFID system is not transmitting interrogation signals in the low-power mode. In some embodiments, in low-power mode, the RFID system continues to communicate with a motion sensor and a voltage detector so as to determine a change in conditions that may result in a transition to the active charging state or the active noncharging state.

In some embodiments, in the low-power mode, the RFID system may still receive signals from the motion sensor. In step 320 of method 300, the RFID system may receive a signal from a motion sensor, such as the motion sensor 114, indicative of a detected motion in the vehicle. For example, in some embodiments, the motion sensor 114 is configured to transmit signals indicating motions that exceed a movement threshold for the purpose of monitoring movements that may potentially move one or more items loaded in the vehicle. After receiving the signal from the motion sensor, in some embodiments, the RFID system may switch the RFID system to a high-power mode as illustrated in step 335 and re-initialize the timer as illustrated in step 310.

As is described herein, the detection of motion indicates that an operator may be moving or otherwise rearranging items in the vehicle. Upon detection of such an event, the RFID system may transition to the high-power mode and/or transition to the high-power mode at a predetermined interval given that it is likely, in some examples, that new location information is available. If the system did not transition to the high-power mode, location information may no longer be relevant.

In step 325 of method 300, the RFID system is configured to, in response to receiving the signal indicative of the detected motion, switch the RFID system to a high-power mode and re-initialize the timer. In the high-power mode, the RFID system is actively monitoring locations of one or more RFID tags associated with one or more items in the vehicle by transmitting one or more interrogation signals. In some embodiments, the RFID system continues to communicate with the motion sensor and a voltage detector in the high-power mode.

In step 330 of method 300, the RFID system is configured to determine that the operating state of the vehicle switched to the active charging state or the active noncharging state. In some embodiments, the RFID system may determine that the operating state of the vehicle switched to the active charging state by using a voltage detector, such as the voltage detector 112, to monitor a vehicle battery associated with the vehicle. For example, the voltage detector 112 may monitor the vehicle power 102 and determine that a battery associated with the vehicle power 102 has started charging, indicating that the vehicle's engine or motor has started and is in the active charging state. Additionally or alternatively, the RFID system may be configured to receive an electric signal from a wire physically attached with an ignition switch of the vehicle. The electric signal may indicate that the ignition switch has been switched which may be used to determine the operating state. For example, in some embodiments, the electric signal may indicate that the ignition switch has been switched to engine or motor on, indicating the active charging state. The electric signal may also indicate the ignition switch has been switched to let the vehicle power to start powering one or more user controlled devices in the vehicle, such as radio, light, or the like, while the engine or motor is still off, indicating the active noncharging state.

In step 335 of method 300, the RFID system is configured to switch the RFID system to a high-power mode. As illustrated in FIG. 3, in some embodiments, the RFID system may switch the RFID system to the high-power mode in response to determining that the operating state of the vehicle switched to the active charging state or the active noncharging state as illustrated in step 330. In some embodiments, the RFID system may also switch the RFID system to the high-power mode in response to receiving a signal from a motion sensor, such as the motion sensor 114, indicative of a detected motion in the vehicle, as illustrated in step 320.

In step 340 of method 300, the RFID system is configured to cause the backup battery to start charging from a vehicle battery, such as a vehicle battery associated with vehicle power 102. In some embodiments, the RFID system may cause the backup battery to start charging by directly controlling the backup battery via the main control unit 210. Step 340 may be performed in response to determining that the operating state of the vehicle switched to the active charging state as illustrated in step 330. In some embodiments, step 340 is not performed if it is determined that the operating state of the vehicle switched to the active noncharging state in step 330.

In alternative embodiments consistent with the scope of the appended claims, some steps described above may be deleted or added, and some steps may be performed in a different order or manner.

In the specification and figures, typical embodiments of the invention have been disclosed. The present invention is not limited to such exemplary embodiments. The use of the term "and/or" includes any and all combinations of one or more of the associated listed items. The figures are schematic representations and so are not necessarily drawn to scale. Unless otherwise noted, specific terms have been used in a generic and descriptive sense and not for purposes of limitation.

The foregoing detailed description has set forth various embodiments of the devices and/or processes via the use of block diagrams, flow charts, schematics, exemplary data structures, and examples. Insofar as such block diagrams, flow charts, schematics, exemplary data structures, and examples contain one or more functions and/or operations, each function and/or operation within such block diagrams, flowcharts, schematics, exemplary data structures, or examples can be implemented, individually and/or collectively, by a wide range of hardware, software, firmware, or virtually any combination thereof.

In one embodiment, the present subject matter may be implemented via Application Specific Integrated Circuits (ASICs). However, the embodiments disclosed herein, in whole or in part, can be equivalently implemented in standard integrated circuits, as one or more computer programs running on one or more computers (e.g., as one or more programs running on one or more computer systems), as one or more programs running on one or more controllers (e.g., microcontrollers), as one or more programs running on one or more processors (e.g., microprocessors), as firmware, or as virtually any combination thereof.

In addition, those skilled in the art will appreciate that the control mechanisms taught herein are capable of being distributed as a program product in a variety of tangible forms, and that an illustrative embodiment applies equally regardless of the particular type of tangible instruction bearing media used to actually carry out the distribution. Examples of tangible instruction bearing media include, but are not limited to, the following: recordable type media such as floppy disks, hard disk drives, CD ROMs, digital tape, flash drives, and computer memory.

The various embodiments described above can be combined to provide further embodiments. These and other changes can be made to the present systems and methods in light of the above-detailed description. Accordingly, the invention is not limited by the disclosure, but instead its scope is to be determined by the following claims.

The invention claimed is:

1. A method for operating a vehicle mounted Radio Frequency Identification (RFID) system, the method comprising:
   operating the vehicle mounted RFID system in a high-power mode;
   determining that an operating state of a vehicle is switched from an active charging state to an inactive state;
   in response to determining that the operating state of the vehicle is switched from the active charging state to the inactive state, initializing a timer for a period of time; and
   in response to an elapse of the period of time, switching the vehicle mounted RFID system to a low-power mode, wherein, in the low-power mode, the vehicle mounted RFID system is configured to receive signals from a motion sensor of the vehicle and a voltage detector of the vehicle.

2. The method of claim 1 further comprising:
   receiving the signal from the motion sensor indicative of a detected motion in the vehicle;
   in response to receiving the signal indicative of the detected motion, switching the vehicle mounted RFID system to the high-power mode; and
   re-initializing the timer for the period of time.

3. The method of claim 1 further comprising:
   determining that the operating state of the vehicle switched to the active charging state or an active noncharging state; and
   in response to determining that the operating state of the vehicle switched to the active charging state or the active noncharging state, switching the vehicle mounted RFID system to the high-power mode.

4. The method of claim 1, wherein the vehicle is in the active charging state when an engine of the vehicle is on, and wherein the vehicle is in the inactive state when the engine of the vehicle is off.

5. The method of claim 1, wherein determining that the operating state of the vehicle switched from the active charging state to the inactive state comprises using the voltage detector to monitor a vehicle battery associated with the vehicle.

6. The method of claim 1 wherein the vehicle mounted RFID system is powered by a backup battery connected to a vehicle battery associated with the vehicle in the low-power mode, and wherein the method further comprises:
 causing the backup battery to start charging from the vehicle battery in response to determining that the operating state of the vehicle switched to the active charging state.

7. The method of claim 6, wherein the method further comprises:
 causing the backup battery to stop charging from the vehicle battery in response to determining that the operating state of the vehicle switched to the inactive state.

8. The method of claim 1, wherein the vehicle mounted RFID system is configured to transmit an interrogation signal to a plurality of RFID tags associated with a plurality of items loaded in the vehicle in the high-power mode.

9. The method of claim 8, further comprising receiving a response from an RFID tag of the plurality of RFID tags, in response to the interrogation signal.

10. The method of claim 1, wherein determining that the operating state of the vehicle is switched from the active charging state to the inactive state comprises receiving a signal from a Global Positioning System (GPS) unit coupled to the vehicle mounted RFID system.

11. A vehicle mounted Radio Frequency Identification (RFID) system configured to:
 operate the vehicle mounted RFID system in a high-power mode;
 determine that an operating state of a vehicle is switched from an active charging state to an inactive state;
 in response to determine that the operating state of the vehicle is switched from the active charging state to the inactive state, initialize a timer for a period of time; and
 in response to an elapse of the period of time, switch the vehicle mounted RFID system to a low-power mode, wherein, in the low-power mode, the vehicle mounted RFID system is configured to receive signals from a motion sensor of the vehicle and a voltage detector of the vehicle.

12. The vehicle mounted RFID system of claim 11, further configured to:
 receive the signal from the motion sensor indicative of a detected motion in the vehicle;
 in response to receiving the signal indicative of the detected motion, switch the vehicle mounted RFID system to the high-power mode; and
 re-initialize the timer for the period of time.

13. The vehicle mounted RFID system of claim 11, further configured to:
 determine that the operating state of the vehicle switched to the active charging state or an active noncharging state; and
 in response to determining that the operating state of the vehicle switched to the active charging state or the active noncharging state, switch the vehicle mounted RFID system to the high-power mode.

14. The vehicle mounted RFID system of claim 11, wherein the vehicle is in the active charging state when an engine of the vehicle is on, and wherein the vehicle is in the inactive state when the engine of the vehicle is off.

15. The vehicle mounted RFID system of claim 11, wherein determining that the operating state of the vehicle switched from the active charging state to the inactive state comprises using the voltage detector to monitor a vehicle battery associated with the vehicle.

16. The vehicle mounted RFID system of claim 11, wherein the vehicle mounted RFID system is powered by a backup battery connected to a vehicle battery associated with the vehicle in the low-power mode, and wherein the vehicle mounted RFID system is further configured to:
 cause the backup battery to start charging from the vehicle battery in response to determining that the operating state of the vehicle switched to the active charging state.

17. The vehicle mounted RFID system of claim 16, further configured to:
 cause the backup battery to stop charging from the vehicle battery in response to determining that the operating state of the vehicle switched to the inactive state.

18. The vehicle mounted RFID system of claim 11, wherein the vehicle mounted RFID system in the high-power mode is configured to transmit an interrogation signal to a plurality of RFID tags associated with a plurality of items loaded in the vehicle.

19. The vehicle mounted RFID system of claim 18, further configured to receive a response from an RFID tag of the plurality of RFID tags, in response to the interrogation signal.

20. The vehicle mounted RFID system of claim 11, wherein the vehicle mounted RFID system is coupled to a Global Positioning System (GPS) unit, and wherein determining that the operating state of the vehicle is switched from the active charging state to the inactive state comprises receiving a signal from the Global Positioning System (GPS) unit.

* * * * *